(12) United States Patent
Li et al.

(10) Patent No.: US 7,143,354 B2
(45) Date of Patent: *Nov. 28, 2006

(54) SUMMARIZATION OF BASEBALL VIDEO CONTENT

(75) Inventors: Baoxin Li, Vancouver, WA (US); Jeffrey B. Sampsell, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 297 days.

This patent is subject to a terminal disclaimer.

(21) Appl. No.: 09/934,004

(22) Filed: Aug. 20, 2001

(65) Prior Publication Data

US 2003/0034996 A1 Feb. 20, 2003

Related U.S. Application Data

(60) Provisional application No. 60/295,906, filed on Jun. 4, 2001.

(51) Int. Cl.
*G06F 3/00* (2006.01)

(52) U.S. Cl. .................................................... 715/725

(58) Field of Classification Search ........ 382/173–231, 382/103, 104, 106; 345/721, 723–725, 589; 348/169, 231.2; 725/34, 133; 715/716, 715/725

See application file for complete search history.

(56) References Cited

U.S. PATENT DOCUMENTS

| | | | |
|---|---|---|---|
| 4,183,056 A | 1/1980 | Evans et al. | |
| 4,253,108 A | 2/1981 | Engel | |
| 4,298,884 A | 11/1981 | Reneau | |
| 5,109,482 A | 4/1992 | Bohrman | |
| 5,452,016 A | 9/1995 | Ohara et al. | |
| 5,521,841 A | 5/1996 | Arman et al. | |
| 5,635,982 A | 6/1997 | Zhang et al. | |
| 5,654,769 A | 8/1997 | Ohara et al. | |
| 5,664,227 A | 9/1997 | Muldin et al. | |
| 5,778,108 A | 7/1998 | Coleman, Jr. | |
| 5,805,733 A | 9/1998 | Wang et al. | |
| 5,821,945 A | 10/1998 | Yeo et al. | |
| 5,920,360 A | 7/1999 | Coleman, Jr. | |
| 5,923,365 A * | 7/1999 | Tamir et al. | 348/169 |
| 5,956,026 A | 9/1999 | Ratakonda | |
| 5,959,681 A | 9/1999 | Cho | |
| 5,959,697 A | 9/1999 | Coleman, Jr. | |
| 5,969,755 A | 10/1999 | Courtney | |
| 5,990,980 A | 11/1999 | Golin | |
| 5,995,095 A * | 11/1999 | Ratakonda | 715/500.1 |
| 6,014,183 A * | 1/2000 | Hoang | 348/702 |
| 6,055,018 A | 4/2000 | Swan | |
| 6,100,941 A * | 8/2000 | Dimitrova et al. | 348/700 |
| 6,141,041 A * | 10/2000 | Carlbom et al. | 348/169 |

(Continued)

OTHER PUBLICATIONS

Chung-Lin Huang; Chih-Yu Chang; "Video Summarization Using Hidden Markov Model", Information Technology: Coding and Computing, 2001. Proceedings. Internat Conference on, Apr. 2-4, 2001, pp. 473-477.*

(Continued)

*Primary Examiner*—Kristine Kincaid
*Assistant Examiner*—Le Nguyen
(74) *Attorney, Agent, or Firm*—Chernoff, Vilhauer, McClung & Stenzel

(57) ABSTRACT

Summarization of video content that includes the identification of a plurality of segments from a Video including baseball. In some embodiments the system does not use a model sequence of frames.

11 Claims, 13 Drawing Sheets

U.S. PATENT DOCUMENTS

| | | | |
|---|---|---|---|
| 6,141,060 | A | 10/2000 | Honey et al. |
| 6,144,375 | A | 11/2000 | Jain et al. |
| 6,219,837 | B1 | 4/2001 | Yeo et al. |
| 6,236,395 | B1 | 5/2001 | Sezan et al. |
| 6,304,665 | B1* | 10/2001 | Cavallaro et al. ........... 382/106 |
| 6,342,904 | B1 | 1/2002 | Vasudevan et al. |
| 6,363,160 | B1* | 3/2002 | Bradski et al. ............. 382/103 |
| 6,418,168 | B1 | 7/2002 | Narita |
| 6,549,643 | B1 | 4/2003 | Toklu et al. |
| 6,556,767 | B1* | 4/2003 | Okayama et al. ............. 386/31 |
| 6,678,635 | B1 | 1/2004 | Torinkere et al. |
| 6,691,126 | B1* | 2/2004 | Syeda-Mahmood ......... 707/102 |
| 6,724,933 | B1* | 4/2004 | Lin et al. ..................... 382/164 |
| 6,774,917 | B1 | 8/2004 | Foote et al. |
| 6,970,510 | B1* | 11/2005 | Wee et al. ................ 375/240.2 |
| 2002/0080162 | A1 | 6/2002 | Pan et al. |
| 2002/0141619 | A1 | 10/2002 | Standridge et al. |
| 2004/0125124 | A1* | 7/2004 | Kim et al. ................... 345/716 |

OTHER PUBLICATIONS

Lambrou et al., "Classification of audio signals using statistical features on time and wavelet transform domains", in Pro. Int. Conf. Acoustic, Speech, and Signal Processing, vol. 6, pp. 3512-3624, Seattle, WA, May 12-15, 1998.

Gargi et al., "Performance characterization of video-shot-change detection method", IEE trans. On Circuit and Systems for Video Technology, vol. 10, pp. 1-13, 2000.

Lui et al., "Dectecting news reporting using AV information", in Proc. IEEE Int. Conf. Image Processing, Kobe, Japan, Oct. 1999, pp. 324-328.

Chan et al., "Real-time lip tracking and bimodal continuous speech recognition", in IEEE workshop Multimedia signal processing, Los Angeles, CA, Dec. 1998, pp. 65-70.

John Canny, "Computational Approach to Edge Detection", IEEE Transactions on Pattern Analysis and Machine Intelligence vol. PAMI-8, No. 6 (vol. 8, No. 6): 679-698 1986.

Yeung, et. al., "Extracting Story Units from Long Programs for Video Browsing and Navigation," IEEE Proceedings of Multimedia '96, 1996, pp. 296-305.

Qian, et. al., "A Computational Approach to Semantic Event Detection," IEEE, 1999, pp. 200-206.

Vasconcelos, et. al., "Bayesian Modeling of Video Editing and Structure: Semantic Features for Video Summarization and Browsing," IEEE, 1998, pp. 153-157.

Smoliar, et. al., "Content-Based Video Indexing and Retrieval," IEEE, 1994, pp. 62-72.

Maybury, et. al., "Multimedia Summaries of Broadcast News," IEEE, 1997, pp. 442-449.

Yeo, et. al., "Retrieving and Visualizing Video," Communications of the ACM vol. 40, No. 12, Dec. 1997, pp. 43-52.

Günsel, et. al., Hierarchical Temporal Video Segmentation and Content Characterization, SPIE vol. 3229, 1997, pp. 46-56.

Dementhon, et. al., "Video Summarization by Curve Simplification," ACM Multimedia, 1998, pp. 211-218.

Ponceleon, et. al., "Key to Effective Video Retrieval: Effective Cataloging and Browsing," ACM Multimedia, 1998, pp. 99-107.

Qian, et. al., "A Robust Real-Time Face Tracking Algorithm," IEEE, 1998, pp. 131-135.

Smith, et. al., "Video Skimming for Quick Browsing Based on Audio and Image Characterization," Carnegie Mellon University, Jul. 30, 1995, pp. 1-21, CMU-CS-95-186, Pittsburgh, PA.

Zhang, et. al., "Content-Based Video Browsing Tools," SPIE vol. 2417, 1995, pp. 389-398

Yeung, et. al., "Video Visualization for Compact Presentation and Fast Browsing of Pictorial Content," IEEE Transactions on Circuits and Systems for Video Technology vol. 7, No. 5, Oct. 1997, pp. 771-785.

Del Bimbo, et. al., "A Spatial Logic for Symbolic Description of Image Contents", Journal of Visual Languages and Computing, 1994, pp. 267-286, Academic Press Limited.

Yow, et. al., "Analysis and Presentation of Soccer Highlights from Digital Video," Proceedings, Second Asian Conference on Computer Vision (ACCV '95), 1995, pp. 1-5, Department of Electrical Engineering, Princeton University.

Courtney, Jonathan, D., "Automatic Video Indexing Via Object Motion Analysis," Pattern Recognition, vol. 30, No. 4, 1997, pp. 607-625, Elsevier Science Ltd.

Aksoy, et. al., "Textural Features for Image Database Retrieval," Intelligent Systems Laboratory, Department of Electrical Engineering, University of Washington, pp. 1-5.

Iyengar, et. al., "Models for Automatic Classification of Video Sequences," SPIE vol. 3312, 1997, pp. 216-227.

Manjunath, et. al., "Texture Features for Browsing a Retrieval of Image Data", IEEE Transactions on Pattern Analysis and Machine Intelligence, vol. 18, No. 8, Aug. 1996, pp. 837-842.

Chaudhuri, et. al., "Improved Fractal Geometry Based Texture Segmentation Technique," IEE Proceedings-E, vol. 140, No. 5, Sep. 1993, pp. 233-241.

Arman, et. al., "Content-Based Browsing of Video Sequences," Proceedings of ACM International Conference on Multimedia'94, Oct. 1994, pp. 1-7.

Intille, et. al., "Visual Tracking Using Closed-Worlds," M.I.T. Media Laboratory Perceptual Computing Section Technical Report No. 294, Nov. 1994, pp. 1-18.

Dimitrova, et. al., "Motion Recovery for Video Content Classification," ACM Transactions on Information Systems, vol. 13, No. 4, Oct. 1995, pp. 408-439.

Satoh, et. al., "Name It: Assocation of Face and Name in Video," Carnegie Mellon University, Dec. 20, 1996, pp. 1-17, CMU-CS-96-205, Pittsburgh, PA.

Picard, R.W., "A Society of Models for Video and Image Libraries," IBM Systems Journal, vol. 35, Nos. 3 & 4, 1996, pp. 292-312.

Lienhart, et. al., "Video Abstracting," Communications of the ACM, vol. 40, No. 12, Dec. 1997, pp. 55-62.

Babaguchi, Noboru, "Towards Abstracting Sports Video by Highlights," IEEE, 2000, pp. 1519-1522.

Kobla, et. al., "Detection of Slow-Motion Replay Sequences for Identifying Sports Videos," IEEE Conference, 1999, pp. 135-140.

Gong, et. al., "Automatic Parsing of TV Soccer Programs," IEEE, 1995, pp. 167-174.

Sunghoon Choi, Yongduek Seo, Hyunwoo Kim, and Ki-Sang Hong, "Where are the ball and players?: Soccer Game Analysis with Color-based Tracking and Image Mosaick," Dept. of EE, Pohang University of Science and Technology, Republic of Korea, pp. 1-15, no date.

Vikrant, Kobla, Daniel DeMenthon, and David Doermann, "Identifying Sports Videos Using Replay, Text, and Camera Motion Features," University of Maryland, Laboratory for Language and Media Processing; at least one year prior to filing date; 12 pages, no date.

Richard W. Conners and Charles A. Harlow, "A Theoretical Comparison of Texture Algorithms," IEEE Transactions on Pattern Analysis and Machine Intelligence, vol. PAMI-2, No. 3, May 1980, pp. 204-222.

S. E. Levinson, L. R. Rabiner, and M. M. Sondhi, "An Introductino to the Application of the Theory of Probabilistic Functions of a Markov Process to Automatic Speech Recognition," American Telephone and Telegraph Company, The Bell System Technical Journal, vol. 62, No. 4, Apr. 1983, pp. 1035-1074.

Lawrence R. Rabiner, "A Tutorial on Hidden Markov Models and Selected Applications in Speech Recognition," Proceedings of the IEEE, vol. 77, No. 2, Feb. 1989, pp. 257-286.

Stephen S. Intille, "Tracking Using a Local Closed-World Assumption: Tracking in the Football Domain," M.I.T. Media Lab Perceptual Computing Group Technical Report No. 296, pp. 1-62, Submitted to the Program in Media Arts and Sciences, School of Architecture and Planning on Aug. 5, 1994.

Padhraic Smyth, "Belief Networks, Hidden Markov Models, and Markov Random Fields: a Unifying View," Information and Computer Science Department, University of California, Irvine, CA, Mar. 20, 1998, pp. 1-11.

Noboru Babguchi, Yoshihiko Kawai, Yukinobu Yasugi, and Tadahiro Kitahashi, "Linking Live and Replay Scences in Broadcasted Sports Video," Proceedings of ACM Multimedia 2000 Workshop on Multimedia Information Retrieval (MIR2000), pp. 205-208, Nov. 2000.

Lexing Xie, "Segmentation and Event Detection in Soccer Audio," EE 6820 Project, Soccer Audio, Columbia University, May 15, 2001, pp. 1-9.

Peng Xu, Chih-Fu Chang, Ajay Divakaran, Anthony Vetro, and Huifang Sun, "Algorithms and System for High-Level Structure Analysis and Event Detection in Soccer Video," Columbia University, ADVENT—Technical Report #111, Jun. 2001.

Hao Pan, Baoxin Li, and M. Ibrahim Sezan, "Automatic Detection of Replay Segments in Broadcast Sports Programs by Detection of Logos in Scene Transitions," IEEE ICASSP 2002, pp. 3385-3388.

Lexing Xie and Shih-Fu Chang, "Structure Analysis of Soccer Video with Hidden Markov Models," ICASSP, 2002.

Riccardo Leonardi and Perangelo Migliorati, "Semantic Indexing of Multimedia Documents," IEEE 2002 (Apr.-Jun. 2002), pp. 44-51.

J. Canny, "A Computational Approach to Edge Detection", IEEE Trans. Pattern Anal. Machine Intelligence, vol. 8, pp. 679-698, 1986.

Y. Wang, Z. Liu, and J-C Huang, "Multimedia Content Analysis—Using bother Audio and Visual Cues," IEEE Signal Processing Magazine, vol. 17, No. 16, pp. 12-36, Nov. 2000.

D.D. Saur, Y-P. Tan, S.R. Kulkarni and P. Ramadge, "Automatic Analysis and Annotation of Basketball Video", Proc. Of SPIE, vol. 3022, pp. 176-187, at least one year prior to the filing date.

D. Yow, B-L. Yeo, M. Yeung and B. Liu, "Analysis and Presentation of Soccer Highlights From Digital Video", Proc. 2$^{nd}$ Asian Conference on Computer Vision, 1995.

T. Kawashima, K. Tateyama, T. Iijima and Y. Aoki, "Indexing of Baseball Telecast for Content-based Video Retrieval", Proc. International Conference on Image Processing, 1998.

B-L. Yeo and B. Liu, "On the Extraction of DC Sequence From MPEG Compressed Video", Proc. International Conference on Image Processing, 1995.

H.B. Lu, Y.J. Zhang and Y.R. Yao, "Robust Gradual Scene Change Detection", Proc. International Conference on Image Processing, 1999.

S.J. Golin, "New Metric to Detect Wipes and Other Gradual Transitions in Video", Proc. IS&T/SPIE Conference on Visual Communicaitons and Image Processing, 1999.

M.R. Naphade, R. Mehrotra, A.M. Ferman, J. Warnick. T.S. Huang and A.M. Tekalp, "A High-Performance Shot Boundary Detection Algorithm Using Multiple Cues", International Conference on Image Processing, 1998.

Proc. International Conference on Image Processing, 1998.

R. Lienhart, "Comparison of Automatic Shot Boundary Detection Algorithms", Proc. IS&T/SPIE Conference on Visual Communications and Image Processing, 1999.

Y. Rui, A. Gupta, A. Acero, "Automatically Extracting Highlights for TV Baseball Programs", Microsoft Research, Redmond, WA, 2000.

B. Li and M.I. Sezan, "Event Detection and Summarization in Sports Video", Sharp Laboratories of America, Camas, WA , 2001, at least one year prior to the filing date.

H. Pan, P. van Beek and M. I. Sezan, "Detection of Slow-Motion Replay Segments in Sports Video for Highlights Generation", Sharp Laboratories of America, Camas, WA, at least one year prior to the filing date.

J.S. Boreczky and L.D. Wilcox, "A Hidden Markov Model Framework for Vidoe Segmentation Using Audio and Image Features", FX Palo Alto Laboratories, Palo Alto, CA, at least one year prior to filing date.

S. Eickeler and S. Muller, "Content-Based Video Indexing of TV Broadcast News Using Hidden Markov Models", Gerhard-Mercator University Duisburg, Germany, Int'l Conf on Acoustic, Speech and Signal Processing, 1999.

W. Wolf, "Hidden Markov Model Parsing of Video Programs", Proc. Int. Conf. Acoustic, Speech, and Signal Processing, 1997.

F.R. Kschischang, "Factor Graphs and the Sum-Product Algorithm", IEEE Transactions on Information Theory, vol. 47, No. 2, Feb. 2001.

* cited by examiner

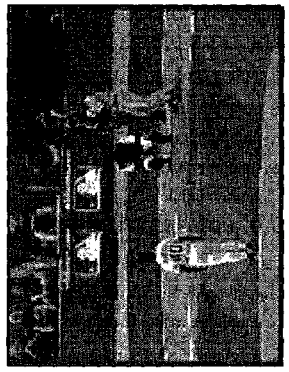
FIG. 4A
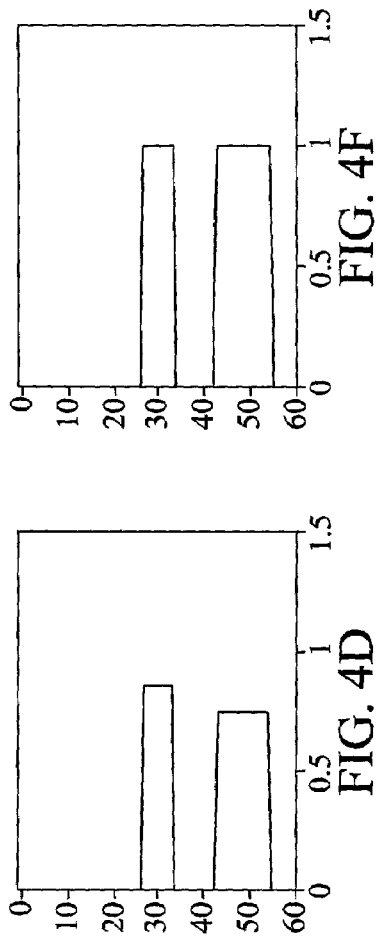
FIG. 4D
FIG. 4F
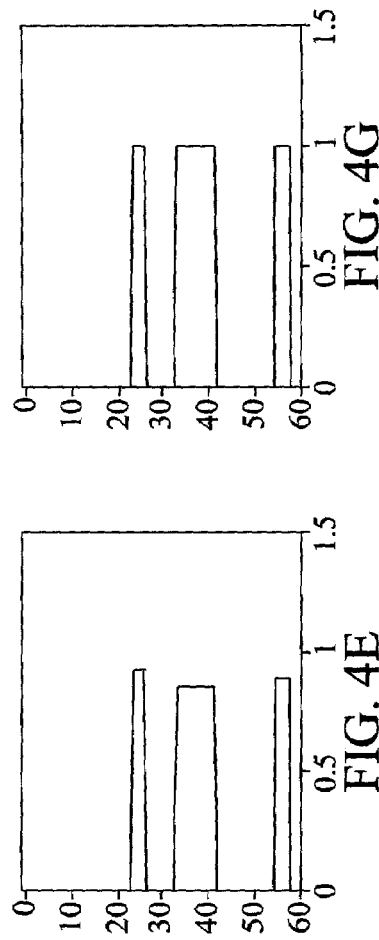
FIG. 4E
FIG. 4G
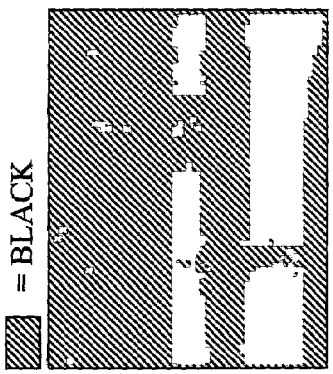
= BLACK
FIG. 4B
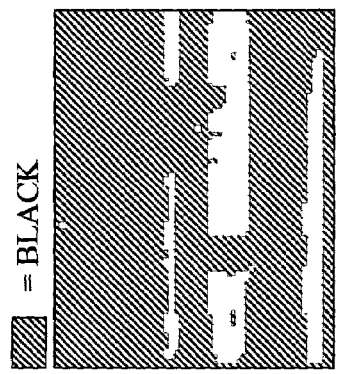
= BLACK
FIG. 4C Commercials

SUMMARIZATION OF BASEBALL VIDEO CONTENT

This application claims the benefit of U.S. patent application Ser. No. 60/295,906, filed on Jun. 4, 2001.

BACKGROUND OF THE INVENTION

The present invention relates to summarization of video content including baseball.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

Kawashima et al, in a paper entitled "Indexing of Baseball Telecast for Content-based Video Retrieval" disclose a technique for indexing a baseball telecast for content-based video retrieval. The system initially detects domain specific scenes in a baseball video based-on image similarity. Each of these scenes, referred to as a basic scene, are the shots which include a single pitching in each. After extracting these scenes, the system spots the exact location of pitching and batting action using continuous dynamic programming matching for fixed areas in the image. If the batter swings the bat, the system determines the end point of the play from the camera view after batting to recognize the batting result. The system also recognizes the caption to verify and confirm the recognition result. The stored summarization version of the telecast with the indexes form a video database. Kawashima et al. incorporate the rules of baseball in order to attempt to extract events from the video, such as the batter's pose using continuous dynamic programming for spotting pitching/batting scene in a basic scene, in the which the system searches the minimal warp function comparing the input video sequence with patching/batting model sequences. The system also attempts to detect and interpret text on the scoreboard, etc. After processing, the resulting video has the same length while being indexed to permit the user to select those portions which are desirable for subsequent viewing. This technique is computationally expensive, varies between different baseball games and especially between different broadcast companies, and is generally prone to error. In particular, the model sequences are generally unable to characterize variations within pitching scenes even if within the same game. Thus, after matching the video sequence with a given model, the matching scores may vary to such a large extent that if one wants to detect all potential pitching scenes, one has to include many false positives. Further, a fixed pitching scene model fails to account for variations across different games and/or different channels. Thus it is difficult to set an optimal threshold for classifying pitching scenes from non-pitching scenes. Thus with a fixed threshold, the system omits many pitching scenes and simultaneously includes many false positive pitching scenes. Also, the system fails to detect other types of activity in baseball that are of interest, such as stealing a base.

What is desired, therefore, is a video summarization technique suitable for video content that includes baseball.

BRIEF DESCRIPTION OF THE DRAWINGS

FIGS. 2A–2F are exemplary illustrations of pitching scenes in baseball.

FIG. 4A is an exemplary frame of a baseball video.

FIG. 4B is a green mask for the frame of FIG. 4A

FIG. 4C is a brown mask for the frame of FIG. 4A.

FIG. 4D is green projection for the mask of FIG. 4B.

FIG. 4E is a brown projection for the mask of FIG. 4C.

FIG. 4F is a quantized green projection of FIG. 4D.

FIG. 4G is a quantized brown projection of FIG. 4E.

DETAILED DESCRIPTION OF THE PREFERRED EMBODIMENT

Figure 1:
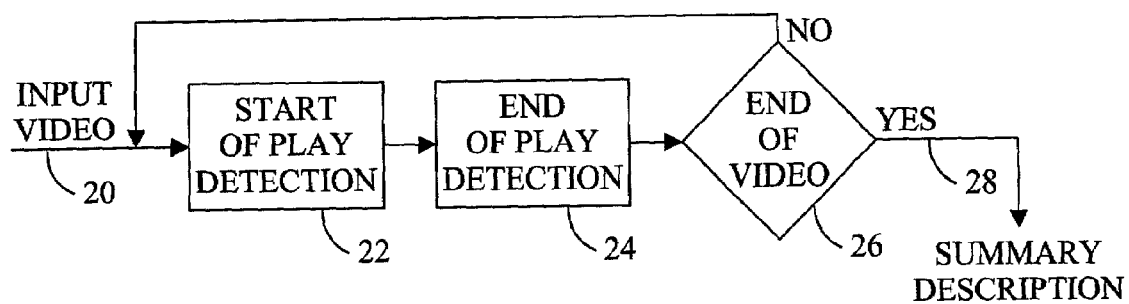
FIG. 1 is an exemplary flowchart for play detection.
Figure 2A:
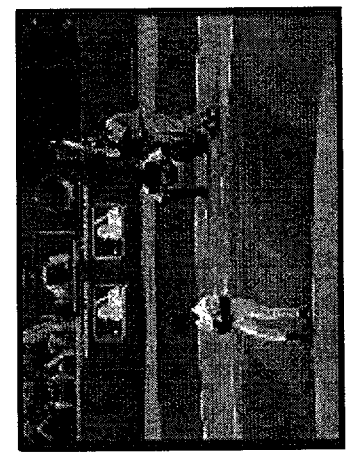
Figure 2B:
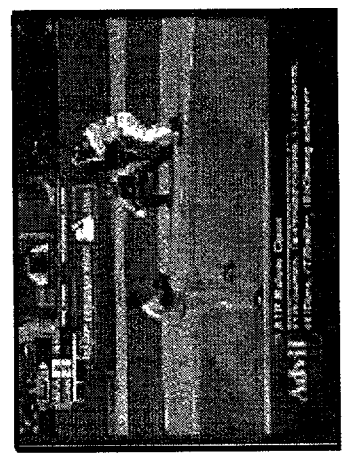
Figure 2C:
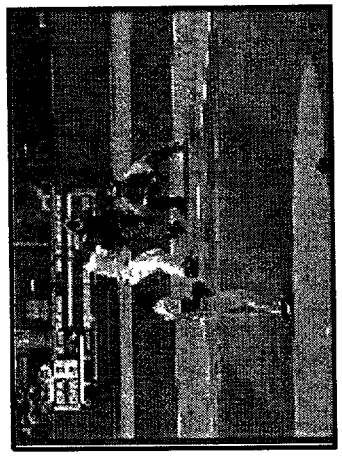
Figure 2E:
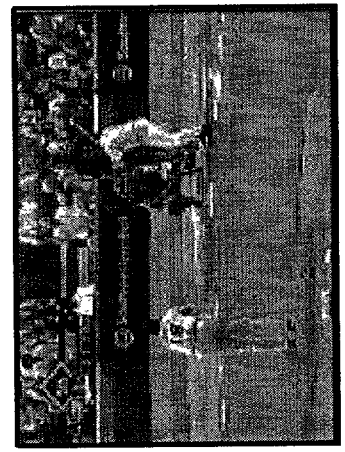
Figure 2F:
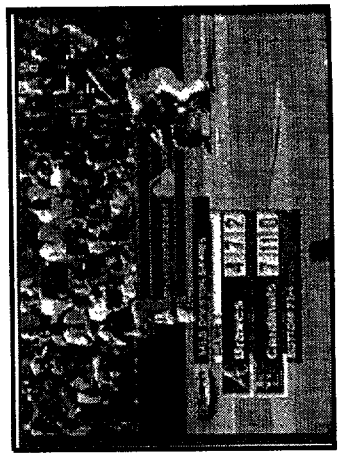

A typical baseball game lasts about 3 hours of which only about one hour turns out to include time during which the ball is in action. The time during which the ball is in action is normally the exciting part of the game, such as for example, pitching the ball to the batter, hitting a home run, hitting the ball, running the bases, a pitch to first base, pitching a "foul" ball, pitching a "strike" ball, pitching a "ball", fouling the ball to the bleachers, catching a pop fly, etc. The remaining time during the baseball game is typically not exciting to watch on video, such as for example, nearly endless commercials, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to sit in a stadium for three hours for a one hour baseball game, many people who watch a video of a baseball game find it difficult to watch all of the game, even if they are loyal fans. A video summarization of the baseball video, which provides a summary of the game having a duration shorter than the original baseball video, may be appealing to many people. The video summarization should provide nearly the same level of the excitement (e.g. interest) that the original game provided.

It is possible to develop highly sophisticated models of a typical baseball video to identify potentially relevant portions of the video. However, such highly sophisticated models are difficult to create and are not normally robust. Further, the likelihood that a majority of the highly relevant portions of the baseball video will be included in such a video summarization is low because of the selectivity of the model. Thus the resulting video summarization of the baseball game may simply be unsatisfactory to the average viewer.

After consideration of the difficulty of developing highly sophisticated models of a baseball video to analyze the content of the baseball video, as the sole basis upon which to create a baseball summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments of the baseball game are preferably selected based upon a "play". A "play" may be defined as an sequence of events defined by the rules of baseball. In particular, the sequence of events of a "play" may be defined as the time generally at which the ball is put into play (e.g., a time based upon when the ball is put into play) and the time generally at which when the ball is considered out of play (e.g., a time based upon when the ball is considered out of play). Normally the "play" would include a related series of activities that could potentially result in a score (or a related series of activities that could prevent a score) and/or otherwise advancing the team toward scoring (or prevent advancing the team toward scoring).

An example of an activity that could potentially result in a score, may include for example, swinging a bat at the ball, and running toward home base after a pitch. An example of an activity that could potentially result in preventing a score, may include for example, catching a pop fly, tagging a runner out at home base, tagging a runner out at second base, throwing the batter out at first bast, and throwing the batter out at second base. An example of an activity that could potentially advance a team toward scoring, may be for example, stealing second base, stealing third base, stealing home base, and batter being walked. An example of an activity that could potentially prevent advancement a team toward scoring, may be for example, throwing a runner out stealing second base, throwing a strike ball over the plate, throwing a runner out stealing third base, throwing a runner out stealing home base, and throwing the batter out at first base. It is to be understood that the temporal bounds of a particular type of "play" does not necessarily start or end at a particular instance, but rather at a time generally coincident with the start and end of the play or otherwise based upon, at least in part, a time (e.g., event) based upon a play. For example, a "play" starting with the pitch of a ball may include the time at which the pitcher starts his windup, the time at which the pitcher releases the ball, the time at which the ball is in the air, and/or the time at which the pitcher receives the ball prior to pitching the ball. A summarization of the video is created by including a plurality of video segments, where the summarization includes fewer frames than the original video from which the summarization was created. A summarization that includes a plurality of the plays of the baseball game provides the viewer with a shorted video sequence while permitting the viewer to still enjoy the game because most of the exciting portions of the video are provided, preferably in the same temporally sequential manner as in the original baseball video.

Figure 16:
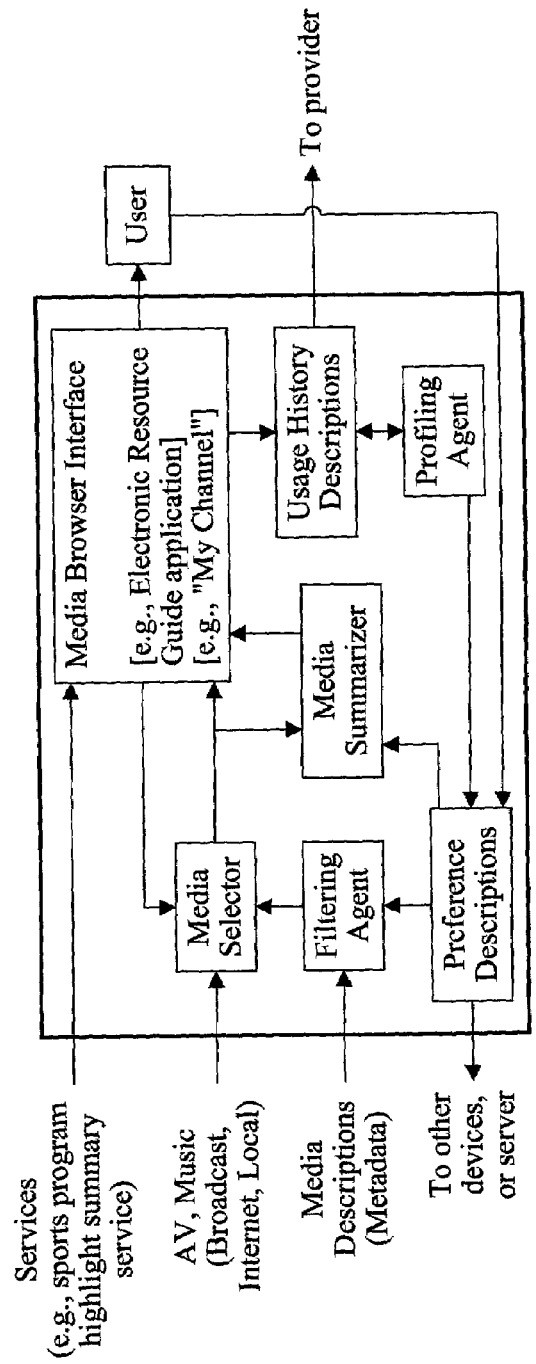
FIG. 16 illustrates the video summarization module as part of a media browser and/or a service application.

Referring to FIG. 1, a procedure for summarization of a baseball video includes receiving a video sequence 20 that includes at least a portion of a baseball game. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser, such as shown in FIG. 16, may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

The present inventors then considered how to detect a "play" from a baseball video in a robust, efficient, and computationally effective manner. After extensive analysis of a typical baseball game it was determined that a baseball game is usually captured by cameras positioned at fixed locations around the baseball field, with each camera typically capable of panning, tilting, and zooming. Each play in a baseball game normally starts with the pitcher releasing the ball, such as toward the catcher or toward one of the basemen. Further, a pitching scene, in which the pitcher is about to throw the ball, is usually captured from a camera location behind the pitcher. This camera angle is typically used because it is easier to observe the movements of all of the parties involved (the pitcher, the batter, the catcher, and the umpire) from this viewpoint. Thus a play typically starts with a frame such as shown in FIGS. 2A–2F.

While an attempt to determine a pitching scene may include complex computationally intensive analysis of the frame(s) to detect the pitcher, the batter, the catcher, and the umpire, together with appropriate motion, this generally results in non-robust pitching scene detection. To overcome this limitation the present inventors were dumbfounded to recognize that the lower portion of a typical pitching frame includes at least one region of generally green colors (grass or artificial turf), and at least one region of generally brown colors (e.g., soil). Normally the lower portion of a typical pitching frame for different fields includes these colors because the pitching mound and batting region are soil, with the region in between being grass or artificial turf. In addition, a typical pitching frame includes two regions of generally brown and/or two regions of generally green. A frame with one region of each color is sufficient.

Also, the present inventors observed that a typical pitching frame includes at least three regions of different colors arranged in alternating dominant horizontally oriented bands. Further, these three or more different color regions are typically generally green and generally brown in color. It is to be understood that the colors may be different depending on the particular anticipated colors, and that all the colors may be different. Depending on the camera angle the pitching scene may have the generally green color at the bottom of the frame or may have the generally brown color at the bottom of the frame. The colors preferably alternate between generally green (or brown) and generally brown (or green). There may be regions of other colors in addition to the generally green and generally brown. Accordingly, the preferred criteria is that the colors should be dominant along the horizontal axis while alternating in the vertical direction for a lower portion of the frame. In addition, the lower portion of the frame may be defined as the lower 75% of the frame, the lower 66% of the frame, the lower 50% of the frame, or the lower 30% of the frame, if desired. It is to be understood that the regions may be arranged in other patterns, as desired. Also, it is to be understood that the location of these regions within the frame may be arranged at other portions of the frame, such as the middle third of the frame, the upper third of the frame, the lower third of the frame, the right half of the frame, the left half of the frame, the central region of the frame, etc. An alternative characterization may be identification of at least three regions of sufficient spatial coherence and sufficient horizontal extent.

Figure 3:
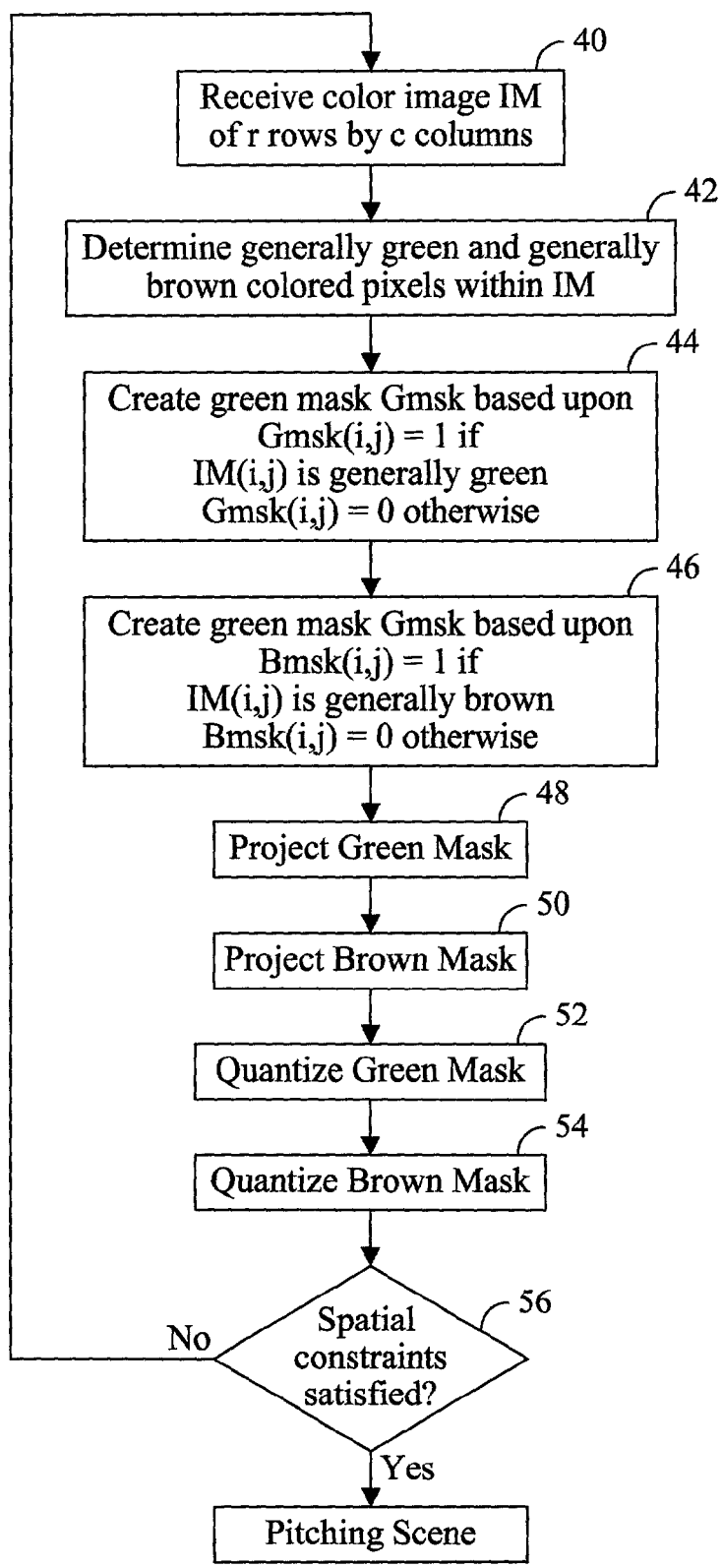
FIG. 3 is an exemplary technique for detecting the start of a pitching scene in baseball.

Referring to FIG. 3, based on these observations, the following technique may be used for detecting the pitching scene. Block 40 receives a color image IM of r rows by c columns. FIG. 4A shows an exemplary frame of a baseball video. Block 42 determines the generally green and generally brown colored pixels within the color image IM. Block 44 creates a green mask Gmsk, with each location assigned a value based upon whether or not the corresponding pixel was generally green. In essence, the Gmsk identifies those pixels of the color image IM that are sufficiently green. FIG. 4B shows an exemplary green mask Gmsk for FIG. 4A. Block 46 creates a brown mask Bmsk, with each location assigned a value based upon whether or not the corresponding pixel was generally brown. In essence, the Bmsk identifies those pixels of the color image IM that are sufficiently brown. FIG. 4C shows an exemplary brown mask Bmsk for FIG. 4A. The result of blocks 44 and 46 is to identify those regions of the color image IM that have colors of interest.

Block 48 projects the green mask Gmsk onto the vertical axis, such as in the manner of a histogram. The green projection may be calculated as $$Gproj(i) = \frac{1}{c}\sum_j Gmsk(i, j)$$

for i=1, . . . ,r. FIG. 4D shows an exemplary horizontal projection onto the vertical axis of the green mask. The projection on the vertical axis Gproj(i) is suitable for identification of significant horizontal regions of the image that correlate to regions of the color image IM that are sufficiently green. Block 50 projects the brown mask Bmsk onto the vertical axis, such as in the manner of a histogram. The brown projection may be calculated as $$Bproj(i) = \frac{1}{c}\sum_j Bmsk(i, j)$$

for i=1, . . . ,r. FIG. 4E shows an exemplary horizontal projection onto the vertical axis of the brown mask. The projection on the vertical axis Bproj(i) is suitable for identification of significant horizontal regions of the image that correlate to regions of the color image IM that are sufficiently brown. The projection technique is used to identify those regions of sufficient spatial coherence and sufficient horizontal extent. It is to be understood that other techniques may likewise be used.

Block 52 quantizes (e.g., binarizes) the green projection. The quantized green projection may be calculated as Gproj(i)=1 if Gproj(i)>p1 and Gproj(i)=0 otherwise, where p1 is a threshold value (static or dynamic). FIG. 4F shows an exemplary binarized green projection. Block 54 quantizes (e.g. binarizes) the brown projection. The quantized brown projection may be calculated as Bproj(i)=1 if Bproj (i)>p1 and Bproj(i)=0 otherwise, where p1 is a threshold value. FIG. 4G shows an exemplary quantized brown projection. The green and brown projections, and especially the binarized green and brown projections, are especially suitable for determining whether the peaks in Gproj and Bproj satisfy the spatial constraints of a pitching scene in block 56. In other words, the desired pattern of generally brown and generally green regions is determined within the frame. If the spatial constraints are satisfied then the frame is considered a pitching frame. If the spatial constrains are not satisfied then the frame is not considered a pitching frame. After extensive testing it has been determined that scenes other than a pitching scene is not likely to have the constraints shown in FIGS. 4D and 4E, or FIGS. 4F and 4G, and accordingly such a constraint will be relatively accurate at detecting pitching scenes.

Figure 5:
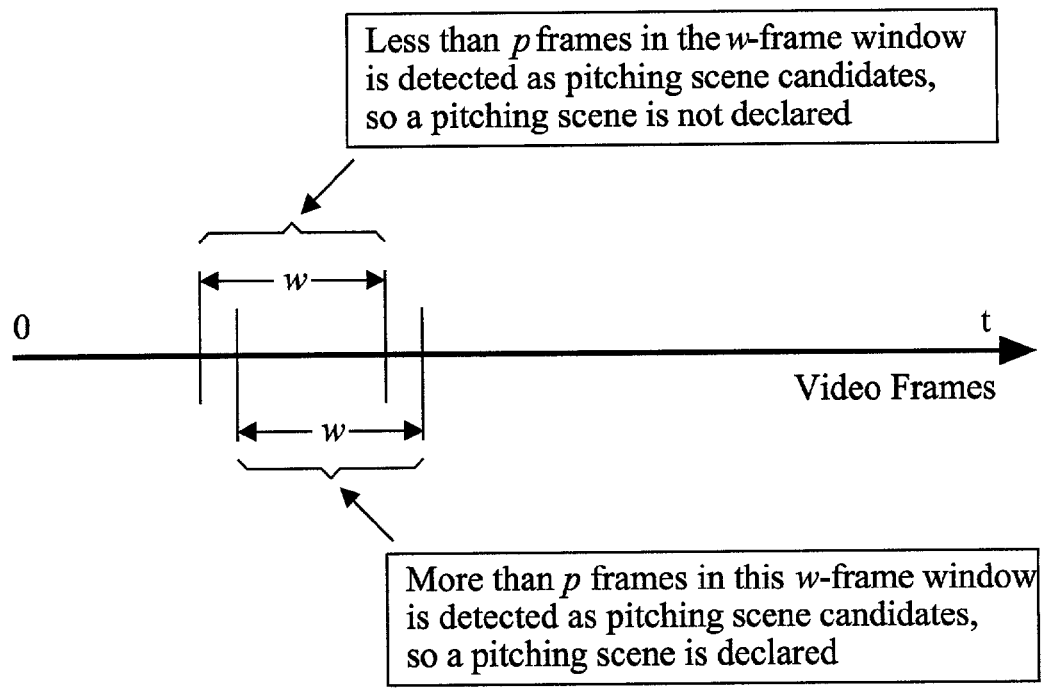
FIG. 5 is an illustration of temporal evidence accumulation.

After further consideration, the present inventors determined that if a pitching scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 5, the following approach may be used to achieve temporal evidence of accumulation: when detecting a pitching scene, a sliding window of width w is used (e.g., w frames are considered at the same time). A pitching scene is declared only if more than p out of the w frames in the current window are determined to be pitching scene candidates, as previously described. A suitable value of p is such that p/w=70%. Other statistical measures may be used of a fixed number of frames or dynamic number of frames to more accurately determine pitching scenes.

Figure 6:
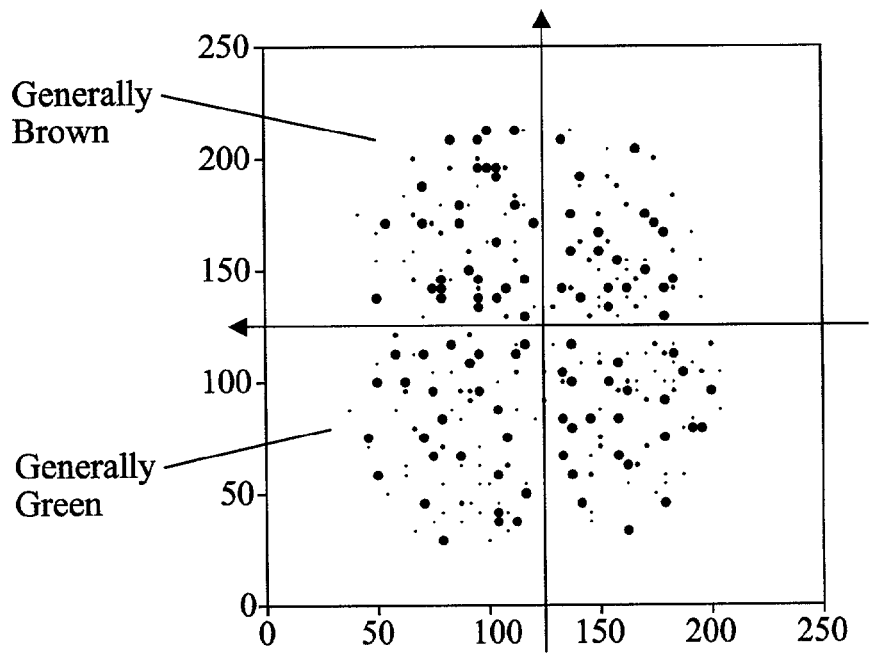
FIG. 6 is an illustration of the U-V plane.

To define the "generally green" color and the "generally brown" color any color space may be used. The preferred color space is the YUV color space because it may be used without excessive computational complexity. In the event that the input video is a MPEG stream, then the Y, U, V components are directly available after decoding, without further color space conversion. Also, a wide range of green and brown colors can be defined by the lower left quadrant and upper left quadrant of the U-V plane, respectively, as illustrated in FIG. 6. Thus, it is computationally efficient to determine the green and brown masks by comparing the U and V signals to a fixed value, such as 128.

While the start of a "play" may be defined as a pitching scene the end of a play, according to the rules of baseball, can end in a variety of different ways. For example, the play can end with the batter missing the ball, the play can end with a home run, the play can end if the ball is fouled away, the play can end with the batter being thrown out at first base, the play can end with the batter being thrown out at second base, and the play can end with the batter being ejected from the game. Image analysis techniques may be used to analyze the image content of the frames after a pitching frame to attempt to determine what occurred. Unfortunately, with the nearly endless possibilities and the difficultly of interpreting the content of the frames, this technique is at least, extremely difficult and computationally intensive. In contrast to attempting to analyze the content of the subsequent frames of a potential play, the present inventors determined that a more efficient manner for the determination of the extent of a play in baseball is to base the end of the play on camera activities. After analysis of a baseball video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 7:
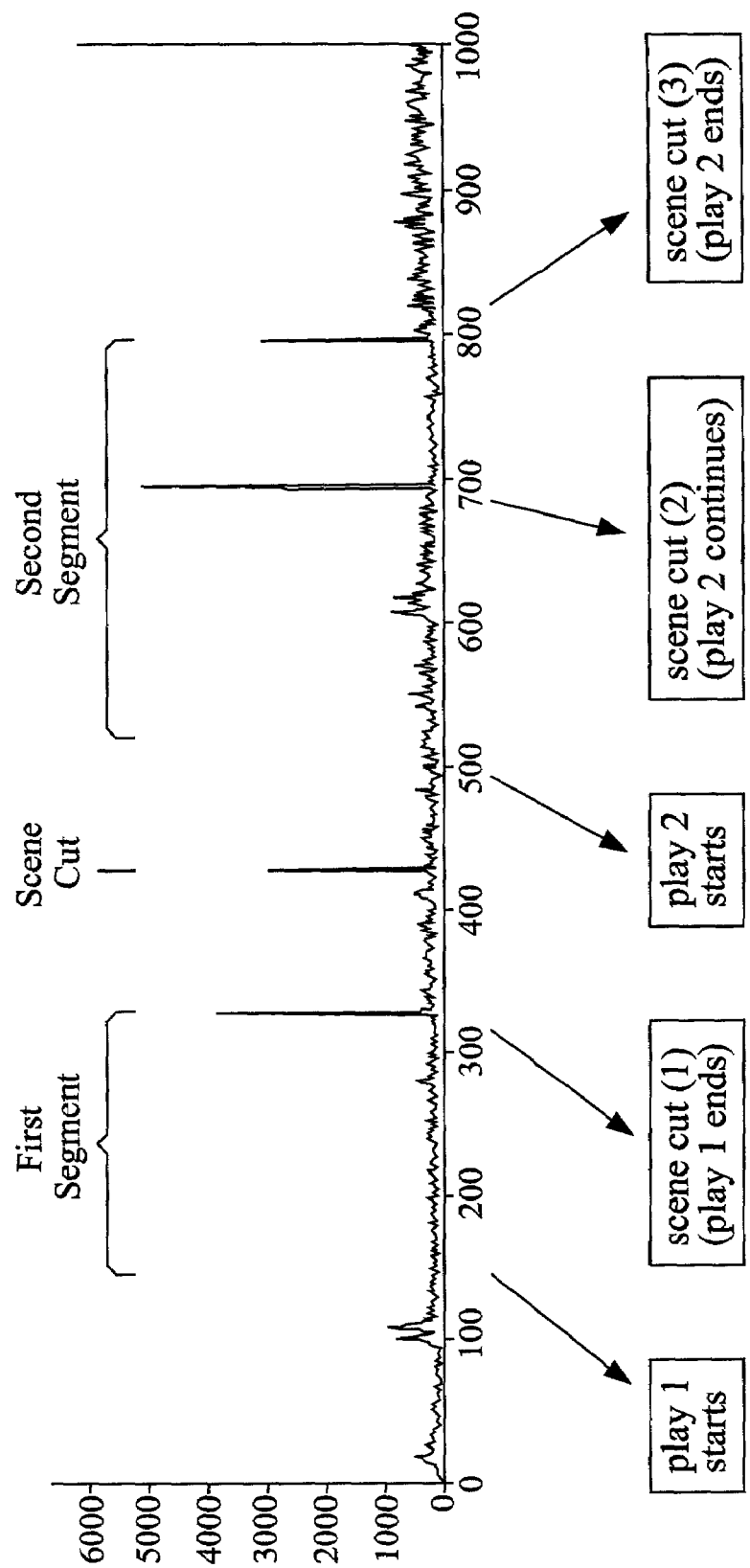
FIG. 7 is an illustration of detecting the end of a play in baseball.
Figure 8:
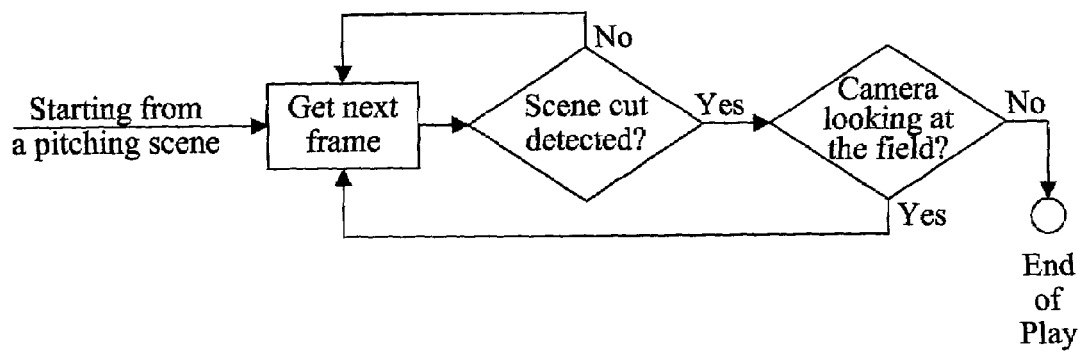
FIG. 8 is an exemplary flowchart for end of play detection.

Referring to FIG. 7, a model of the amount of change between frames using a color histogram difference technique for an exemplary 1,000 frame video baseball clip is shown. The peaks typically correspond to scene cuts. The system may detect a pitching scene at around frame 170. In this particular video clip the batter did not swing, and after the catcher caught the ball, there is a scene cut at frame 322. Accordingly, a first segment may be defined from frame 170 to frame 322. After the pitcher was ready for another throw, the camera was switched back resulting in a scene cut at frame 428. A new pitching scene was detected at frame 520. This time the batter hit the ball, and the camera was switched to follow the flying ball which resulted in scene cut 2. In this case, the play continues, until another scene cut (scene cut 3) when the current play ends and another camera break occurs. As it may be observed, the scene cut (1) properly identifies the end of the first segment in the first pitching scene, while the scene cut (2) does not properly identify the end of the second segment in the second pitching scene. Accordingly, for a more accurate representation of the play it is desirable to distinguish between scene cuts where the play continues and scene cuts where the play ends or has ended. To make this determination, the present inventors determined that most scene cuts where the play continues occurs when the camera is still looking primarily at the field. In this case, the play should continue until a scene cut occurs where the camera is not looking at the field. If after the scene cut the camera is not looking at the field, then the current play ends. The field may be detected in any manner, such as the frame having sufficient generally green or generally brown colors. A flow chart of the technique for detecting the end of a play is shown in FIG. 8.

As previously noted the scene cuts may be detected by thresholding the color histogram differences. The selection of the an appropriate threshold level to determine scene cuts may be based on a fixed threshold, if desired. The appropriate threshold level may be calculated for each baseball video, either after processing a segment of the video or otherwise dynamically while processing the video. One measure of the threshold level may be based upon the mean m and the standard deviation $\sigma$ of the frame-to-frame color histogram differences from the whole video. The threshold can be calculated as $m+c\sigma$ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

Although most plays start with a pitching scene illustrated in FIG. 2, one of the potential plays in baseball starts with a different camera angle, namely, the one for base-stealing.

Figure 9:
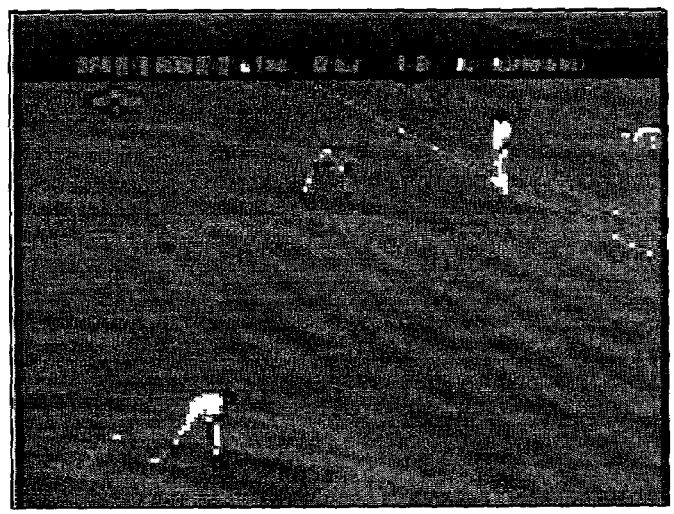
FIG. 9 is an illustration of a base-stealing scene from the first base.

Typically the base stealing camera is directed toward first base (though second and third base are likewise possible). An example of a typical broadcast base-stealing frame is illustrated in FIG. 9. The detection technique may be used to likewise readily detect base stealing frames as the start of a play. In this case the colors tend to be a region of generally brown for the mound, generally green for the field, and generally brown for the field. However, the size of the brown regions are significantly different, which may be used as a basis to characterize the field. Also, the regions tend to encompass the entire frame (or majority).

Figure 10:
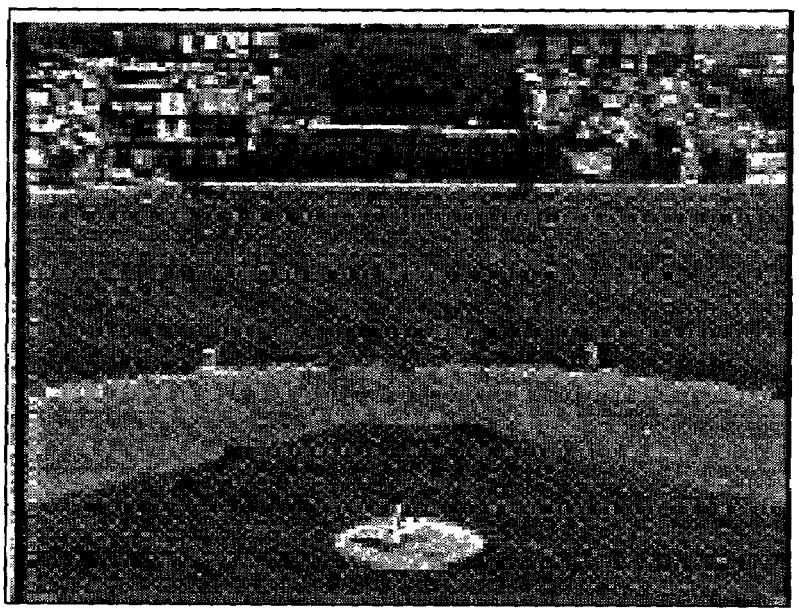
FIG. 10 is an illustration of a pitching scene at long distance.

Referring to FIG. 10, another camera angle that is sometimes used for the start of a pitching scene is from far above the batter so most of the field is viewable. (Similar occurs for far behind the batter.) The detection technique may be used to likewise detect this view as the start of a play. In this case the colors tend to encompass the entire frame (or majority).

While very loose color definitions for the colors is permitted, it is possible to calibrate the colors for a specific game. Calibrated colors permits more accurate play detection for a particular video. The calibration may be performed by a human operator or by the system with the assistance of a human operator. The system may perform automatic calibration by using appropriate statistical techniques. A simple technique is as follows. If the system has obtained a set of pitching scene candidates, the system can estimate the color histograms for green and brown colors, respectively, from these candidates. Under the assumption that most of the candidates are true pitching scene frames, the system can detect statistical outliers in this set. The system then uses the remaining candidate frames to estimate the specifics of the colors. With the green and brown colors calibrated, the system can perform both the start-of-play detection and the end-of-play detection more accurately.

Figure 11:
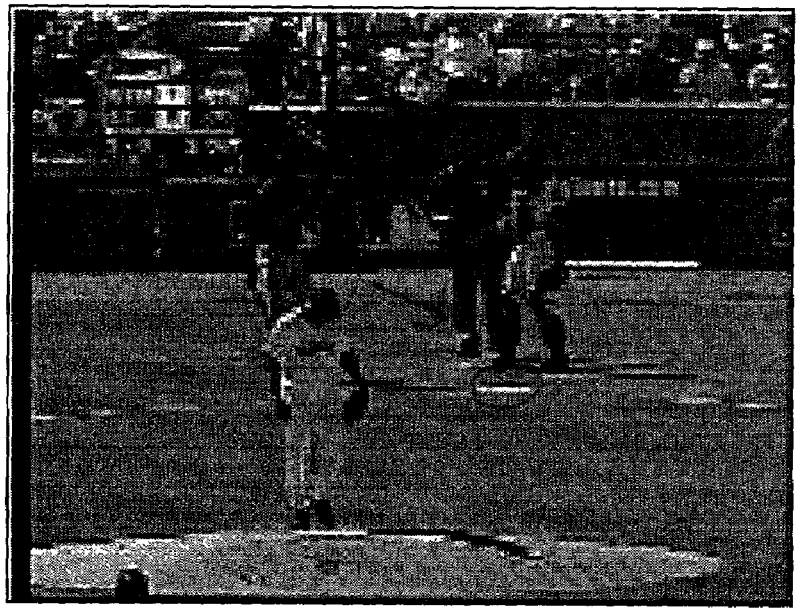
FIG. 11 is an illustration of a pitching scene with the batter not ready to hit the ball.

At times the pitcher is ready to pitch but the batter is sometimes not yet in position and it takes the batter considerable time to get into position, such as shown in FIG. 11. In this case, the resulting play and thus the summary will contain significant time during which the batter is getting ready. To further refine the start of the play, a batter position module may be used. The module detects whether there are multiple sufficient gaps in the highest green region, and preferably whether the gaps shift with time. The gaps are readily observable in the green mask. If more than two sufficient gaps exist or the gaps shift with time, then the batter is typically not ready. Otherwise the batter is ready.

Figure 12:
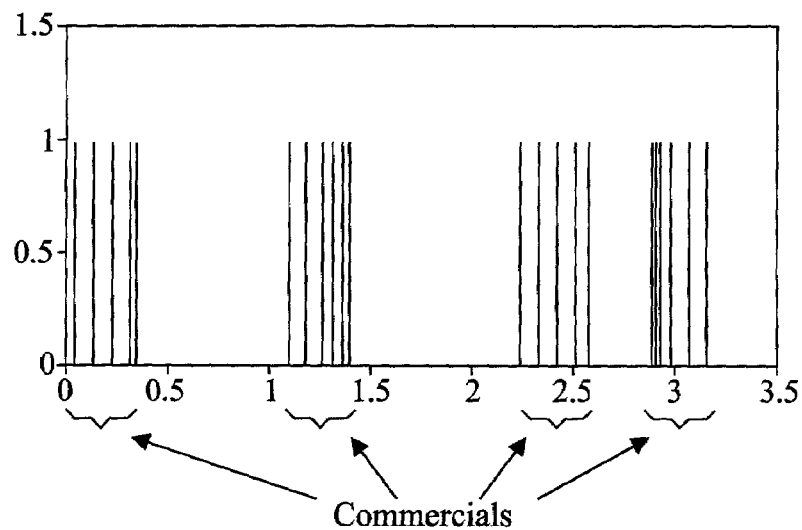
FIG. 12 illustrates the detection of black frames for commercials.
Figure 13:
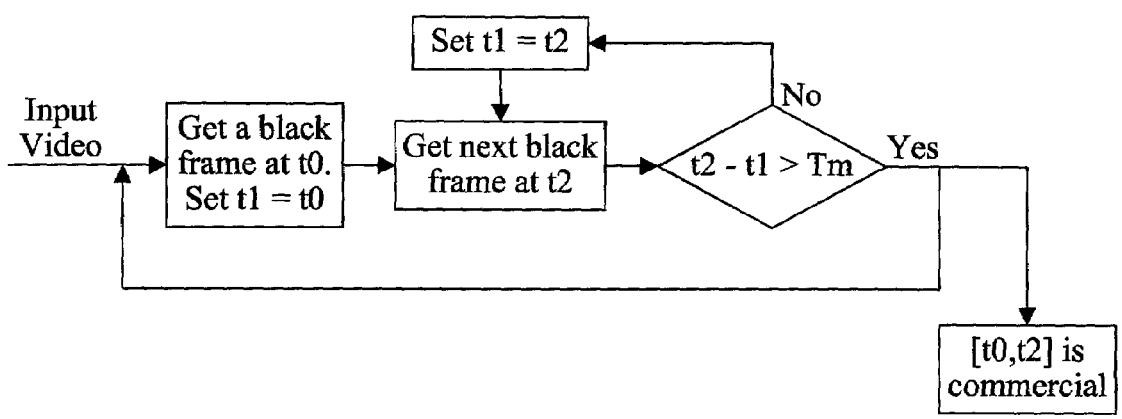
FIG. 13 illustrates an exemplary technique for segment removal based upon commercial information.

A commercial detection module may be used to further refine the potential play segments by removing those segments that are contained within commercials. In the broadcast industry, one or more black frames are inserted into the program to separate different commercials in the same commercial session. Referring to FIG. 12, an example of the distribution of black frames in a video of 35,000 frames, where a line shows the location of a black frame. Visually, it becomes apparent that the clusters of black frames are commercials. One technique for the detection of clusters, is shown in FIG. 13. The algorithm presumes that a regular program session will last at least Tm minutes. For example, Tm is typically larger than three minutes. On the other hand, it is unlikely that a single commercial will last more than two minutes. Thus, as long as black frames are used to separate different commercials in a commercial session, the preferred system will operate properly. By setting Tm reasonably large (e.g., three minutes), the system can still detect commercials even if not all the commercials in a commercial session are separated by black frames. Also, a reasonably large Tm will reduce the likelihood that the regular program is misclassified as a commercial.

If desired, a slow motion replay detection module may be incorporated. The system detects if a slow motion replay has occurred, which normally relates to important events. The system will capture the replays of plays, the same as the typical non-slow motion replay (full speed), if the same type of camera angles are used. The play segments detected may be identified with multiple characteristics, namely, slow motion replay-only segments, play only segments without slow motion replay segments, and slow motion replay that include associated full speed segments. The resulting summary may include one or more of the different selections of the aforementioned options, as desired. For example, the resulting summary may have the slow-motion replays removed. These options may likewise be user selectable.

While an effective summarization of a baseball video may be based on the concept of the "play", sometimes the viewer may prefer an even shorter summarization with the most exciting plays included. One potential technique for the estimation of the excitement of a play is to perform statistical analysis on the segments to determine which durations are most likely to have the highest excitement. However, this technique will likely not provide sufficiently accurate results. Further, excitement tends to be a subjective measure that is hard to quantify. After further consideration the present inventors came to the realization that the audio provided together with the video provides a good indication of the excitement of the plays. For example, the volume of the response of the audience and/or the commentators provides a good indication of the excitement. The louder audience and/or commentator acclaims the greater the degree of excitement.

Figure 14A:
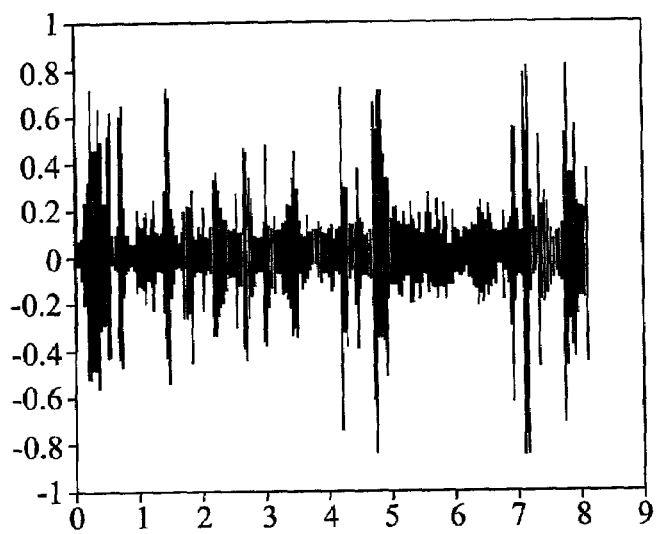
FIGS. 14A–14C illustrate audio segments of different plays.
Figure 14B:
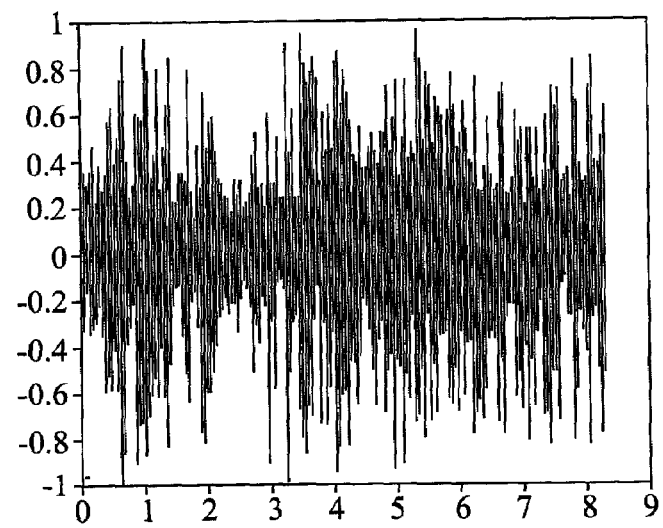
Figure 14C:
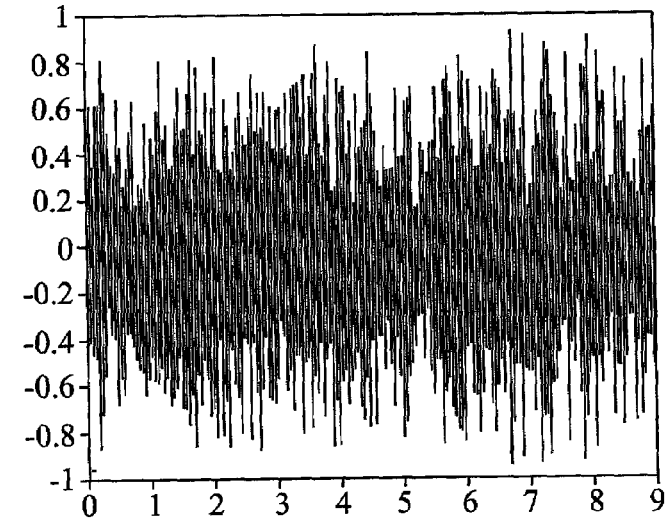

Referring to FIGS. 14A–14C, an exemplary illustration is shown of audio signals having a relatively quiet response (FIG. 14A), having a strong response (FIG. 14B), and having an extremely strong response (FIG. 14C). In general, it has been determined that more exciting plays have the following audio features. First, the mean audio volume of the play is large. The mean audio volume may be computed by defining the mean volume of a play as $$v = \frac{1}{N}\sum_{i=0}^{N-1} S^2(i)$$

where S(i) is the i-th sample, and the N is the total number of samples in the play. Second, the play contains more audio samples that have middle-ranged magnitudes. The second feature may be reflected by the percentage of the middle-range-magnituded samples in the play, which may be computed as $$P = \frac{1}{N}\sum_{i=0}^{N-1} I(|s(i)| > t1 \text{ and } |s(i)| < t2)$$

with I( ) being the indicator function (I(true)=1, and I(false)=0), t1 and t2) are two thresholds defining the middle range.

Figure 15:
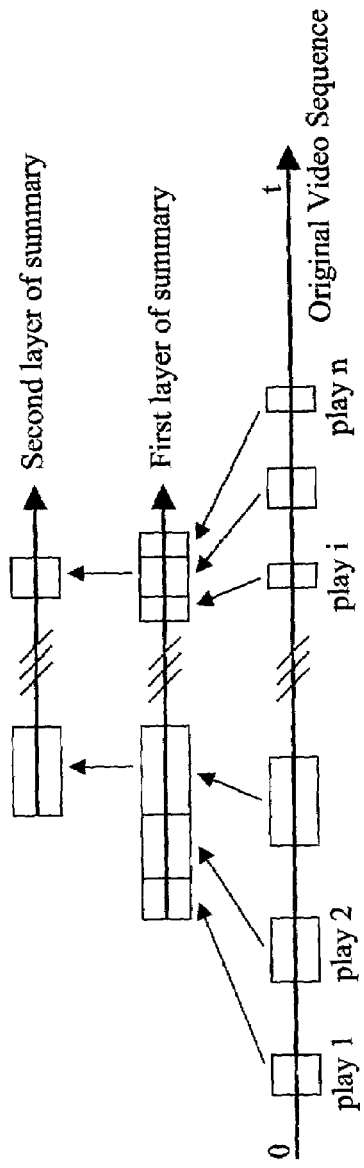
FIG. 15 illustrates forming a multi-layered summary of the original video sequence.

Referring to FIG. 15, the first layer of the summary is constructed using the play detection technique. The second and third layers (and other) are extracted as being of increasingly greater excitement, based at least in part, on the audio levels of the respective audio of the video segments. Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired.

Another module that may be included within the system is a caption detection module. Periodically baseball video includes captions on the lower or upper portion of the screen that contain information. These captions may be detected and analyzed to determine the occurrence of a particular event, such as a home run. Further, the captions of the summary segments may be analyzed to determine the type of event that occurred. In this manner, the summary segments may be further categorized for further refinement and hierarchical summarization.

From a typical pitching scene as illustrated in FIG. 2, it may be observed that the top portion of the image is usually highly textured since it corresponds to the audience area, while the lower portion is relatively smooth. The present inventors determined that, in a pitching scene, the players' bodies usually result in textured regions. This texture information can be exploited to assist the detection of a pitching scene. The system may obtain a binary texture map as follows. For a pixel PO in the input frame, the system considers its neighbors, such as P1~P4, as illustrated in the following:

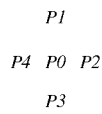

Next, the system computes absolute luminance differences $DY_i=|Y0-Y_i|$, for $i=1~4$, where $Y_i$ is the luminance value at pixel $P_i$. If more than two (2) out of the four (4) DY's are larger than a threshold, then P0 may be considered "textured"; otherwise, P0 is "non-textured". The texture map so-defined is not computationally expensive to obtain. Other texture calculation techniques may likewise be used.

Figure 18:
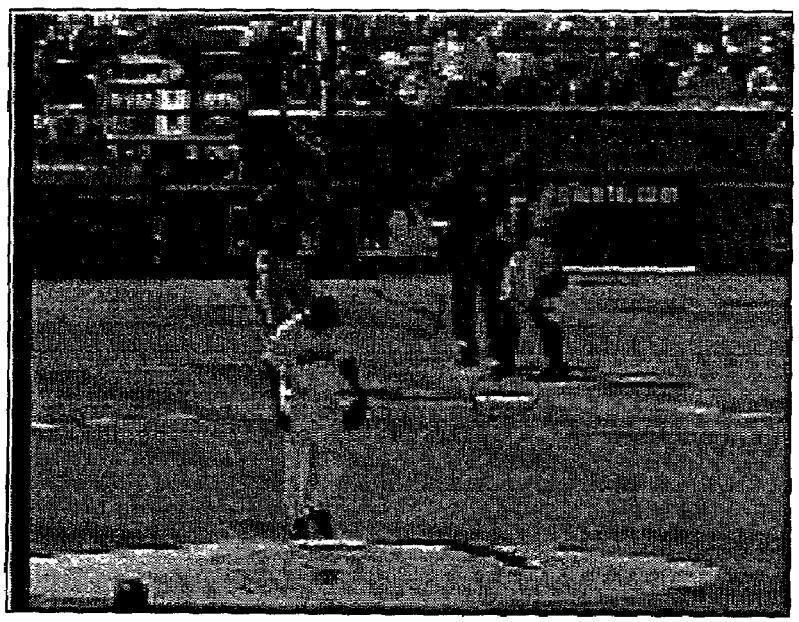
FIG. 18 illustrates a pitching scene.
Figure 19:
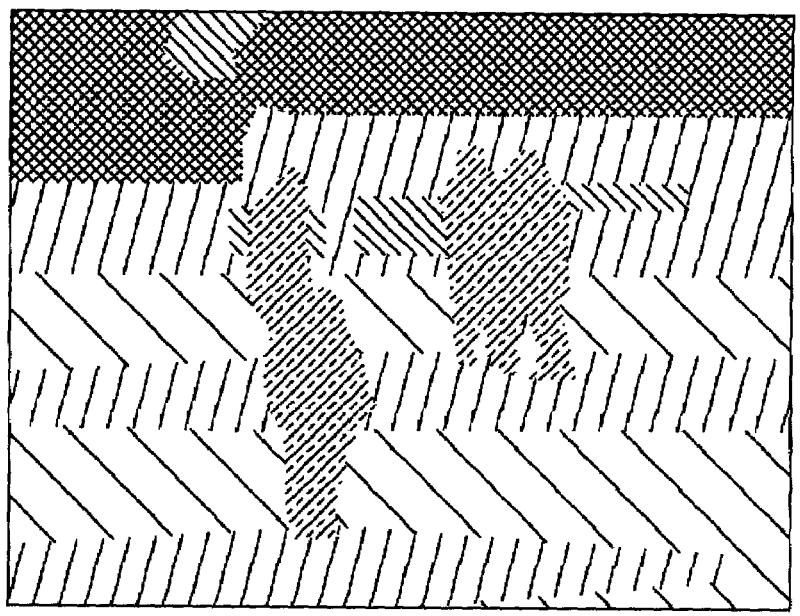
FIG. 19 illustrates a texture map for FIG. 18.

The following is an example illustrating the detected textured regions, where FIG. 18 is the original image and, FIG. 19 the obtained texture map with white pixels denoting the detected textured regions. The texture map of FIG. 19 is examined to see if it conforms to the constraints of a pitching scene. This may be an upper textured region, a pitcher textured region and other regions not generally not textured. This texture analysis may be used alone or in conjunction with other parts of the system to detect or confirm the start of a play.

When a play is about to start, the camera is typically focused on the players who are posing to play. Thus right before the start of a play, there should not be dramatic camera motion, and especially there should not be dramatic translational camera motion. Since the camera motion usually results in global motion in a video, the above constraint becomes: there should not be dramatic global motion (especially translational motion) in the video right before a play starts. The system may use a motion analysis module to check if a potential start-of-play satisfies this constraint. Although many methods exist for motion estimation, for computational efficiency, the preferred technique is a block-matching method for estimating the global motion.

As previously discussed, a play ends when there is a scene change and the camera is not viewing at the field. While scene change is relatively easy to detect, judging if the camera is viewing the field may be challenging under certain situations. For example, when a frame contains only very small regions of field colors, it is difficult to determine if the camera is viewing at the field. This situation could happen when a camera is shooting from a side view of a player running from one base to another. To prevent a play from being cut short due to the lack of enough color information for determining if the camera is viewing at the field, the system may use motion analysis to extend those plays that have a scene cut on a running player (e.g., a home-run). These scenes may result in frames with only a little field, but with strong horizontally motion. Motion estimation may be used in the following way: if the frame after the scene cut contains only a little field, but there is strong horizontal motion, then the system will let the play continue before ending the play. This motion analysis may be used alone or in conjunction with other parts of the system to detect or confirm the end of the play.

Referring to FIG. 16, the video summarization may be included as part of an MPEG-7 based browser/filter, where summarization is included within the standard. The media summarizer may be as shown in FIG. 1. With different levels of summarization built on top of the aforementioned video summarization technique, the system can provide the user with varying levels of summaries according to their demands. Once the summary information is described as an MPEG-7 compliant XML document, one can utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels.

In the case that the summarization is performed at a server or service provider, the user downloads and receives the summary description encoded in MPEG-7 format. Alternatively, in an interactive video on demand (VOD) application, the media and its summary description reside at the provider's VOD server and the user consumes the summary via a user-side browser interface. In this case, the summary may be enriched further by additional information that may be added by the service provider. Further, summarization may also be performed by the client.

Figure 17:
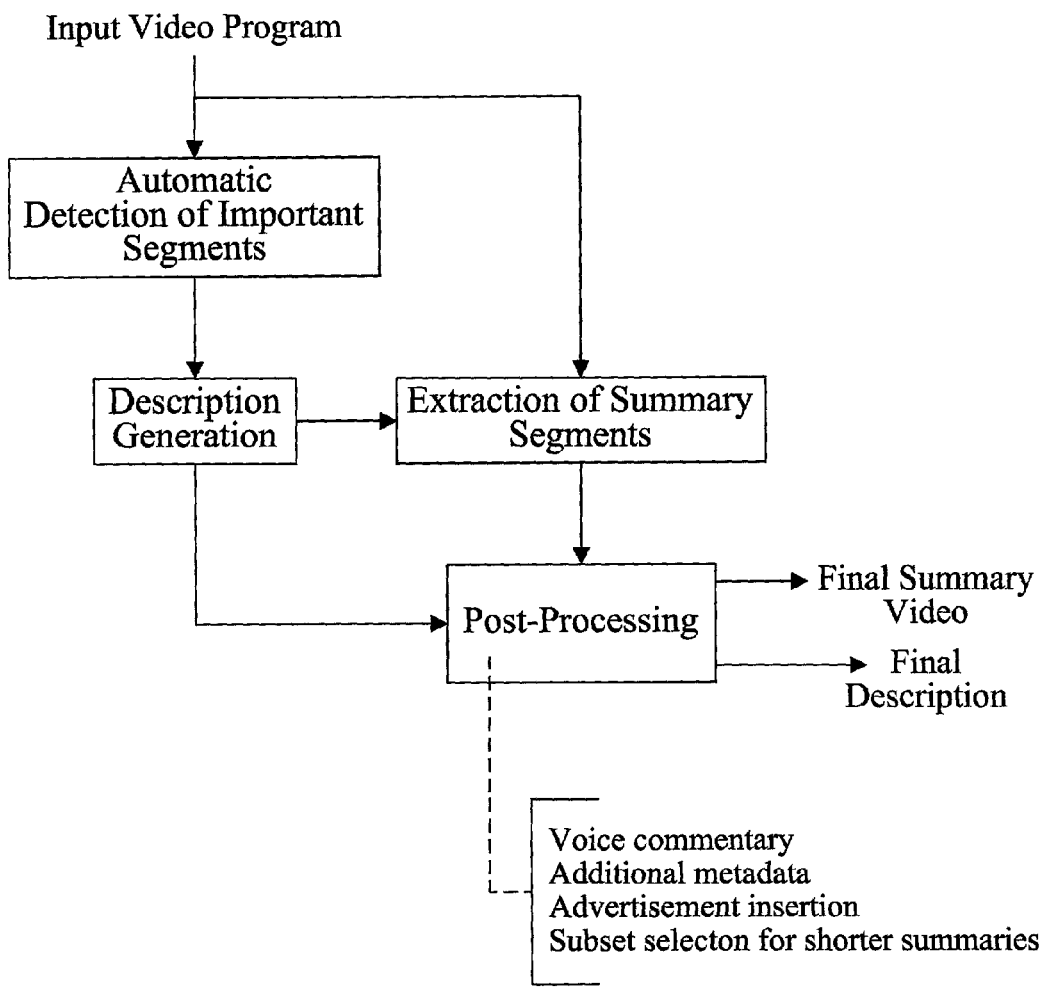
FIG. 17 illustrates a video processing system.

Referring to FIG. 17, the output of the module that automatically detects important segments may be a set of indices of segments containing plays and important parts of the input video program. A description document, such as an MPEG-7 or TV-Anytime compliant description is generated in The Description Generation module. Summary segments are made available to the Post-Processing module by The Extraction of Summary Segments module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g., binarized if it is generated originally in textual format such as XML. Post-processing may include adding to the original audio track a commentary, insertion of advertisement segments, or metadata. In contrast to play detection, post-processing may be completely, or in part, manual processing. It may include, for example, automatic ranking and subset selection of events on the basis of automatic detection of features in the audio track associated with video segments. This processing may be performed at the server and then the resulting video transferred to the client, normally over a network. Alternatively, the resulting ideo is included in a VOD library and made available to the users on a VOD server.

The invention claimed is:

1. A method of processing a video including baseball comprising:
   (a) identifying a plurality of segments of said video, wherein the start of said plurality of segments is identified based upon detecting at least one spatial region of a generally homogeneous green color in a generally lower region of said video and at least two spatial regions of a generally homogeneous brown color in a pair of spaced apart spatial horizontal regions where said generally homogeneous green region is between said horizontal regions, where each of said segments includes a plurality of frames of said video; and
   (b) creating a summarization of said video by including said plurality of segments, where said summarization includes fewer frames than said video.

2. The method of claim 1 further comprising detecting at least two regions of said generally green color.

3. The method of claim 1 further comprising detecting at least two regions of said generally brown color.

4. The method of claim 3 further comprising detecting at least two regions of said generally green color.

5. The method of claim 1 wherein said green color and said brown color are generally vertically aligned.

6. The method of claim 1 wherein said green color region and said brown color region have sufficient horizontal spatial extent.

7. A method of processing a video including baseball comprising:
   (a) identifying a plurality of segments of said video, wherein the start of said plurality of segments is identified based upon detecting at least three spatial regions of horizontally oriented regions of generally homogenous colors including at least one of generally homogeneous brown and generally homogenous green, where each of said segments includes a plurality of frames of said video; and
   (b) creating a summarization of said video by including said plurality of segments, where said summarization includes fewer frames than said video.

8. The method of claim 7 wherein at least two of said regions have the same dominant color.

9. The method of claim 7 wherein at all of said at least three regions have different said colors.

10. The method of claim 8 wherein said at least two regions are located on opposing sides of another said detected region of a different color.

11. The method of claim 7 wherein said one of said regions is generally brown and another of said regions is generally green.

* * * * *